(12) United States Patent
Mou et al.

(10) Patent No.: US 12,440,792 B2
(45) Date of Patent: *Oct. 14, 2025

(54) AIR POLLUTION PREVENTION DEVICE FOR BABY CARRIAGE

(71) Applicant: Microjet Technology Co., Ltd., Hsinchu (TW)

(72) Inventors: Hao-Jan Mou, Hsinchu (TW); Yung-Lung Han, Hsinchu (TW); Chi-Feng Huang, Hsinchu (TW); Chun-Yi Kuo, Hsinchu (TW); Chin-Wen Hsieh, Hsinchu (TW); Tsung-I Lin, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 756 days.

This patent is subject to a terminal disclaimer.

(21) Appl. No.: 17/746,449

(22) Filed: May 17, 2022

(65) Prior Publication Data
US 2022/0370946 A1 Nov. 24, 2022

(30) Foreign Application Priority Data
May 21, 2021 (TW) ................................ 110118497

(51) Int. Cl.
*B01D 46/46* (2006.01)
*A61L 9/22* (2006.01)
(Continued)

(52) U.S. Cl.
CPC ................ *B01D 46/46* (2013.01); *A61L 9/22* (2013.01); *B01D 46/0004* (2013.01);
(Continued)

(58) Field of Classification Search
CPC .. B01D 46/46; B01D 46/0004; B01D 46/442; B01D 53/885; B62B 9/14; B62B 9/00; A61L 9/20; A47D 15/00; F24F 3/16
See application file for complete search history.

(56) References Cited

U.S. PATENT DOCUMENTS

| | | | |
|---|---|---|---|
| 11,753,060 B2 * | 9/2023 | Mou ........................ | B62B 9/14 96/223 |
| 12,235,016 B2 * | 2/2025 | Mou ..................... | F24F 1/0022 |

(Continued)

FOREIGN PATENT DOCUMENTS

| | | |
|---|---|---|
| CN | 1912482 A | 2/2007 |
| CN | 105216850 A | 1/2016 |

(Continued)

OTHER PUBLICATIONS

KR 20180053051 A (English translation) (Year: 2018).*
CN 109421781 A (English translation) (Year: 2019).*
CN 111907582 A (English translation) (Year: 2020).*

*Primary Examiner* — Maris R Kessel
*Assistant Examiner* — Nebyate Samuel Seged
(74) *Attorney, Agent, or Firm* — Birch, Stewart, Kolasch & Birch, LLP

(57) ABSTRACT

An air pollution prevention device applied for a baby carriage includes a sealing cover, a filtration cleaner, a gas detection module and an intelligent control and process device. The sealing cover is hooded on the baby carriage for forming a sealed space. The filtration cleaner penetrates the sealing cover form the outside of the baby carriage for introducing an outside air into the sealed space of the baby carriage and discharging an air pollution source out of the sealed space. The gas detection module detects the air pollution source and outputs gas detection data. The intelligent control and process device receives and compares the gas detection data and controls an enablement of a gas
(Continued)

guider of the filtration cleaner for filtering and exchanging the air pollution source in the sealed space so as to generate a clean air.

20 Claims, 21 Drawing Sheets

(51) Int. Cl.
*B01D 46/00* (2022.01)
*B01D 46/44* (2006.01)
*B01D 53/00* (2006.01)
*B01D 53/04* (2006.01)
*B01D 53/32* (2006.01)
*B01D 53/88* (2006.01)
*B62B 9/14* (2006.01)

(52) U.S. Cl.
CPC ..... *B01D 46/0028* (2013.01); *B01D 46/0041* (2013.01); *B01D 46/0047* (2013.01); *B01D 46/442* (2013.01); *B01D 46/448* (2013.01); *B01D 53/007* (2013.01); *B01D 53/0446* (2013.01); *B01D 53/0454* (2013.01); *B01D 53/32* (2013.01); *B01D 53/885* (2013.01); *B62B 9/14* (2013.01); *A61L 2209/14* (2013.01); *B01D 2253/102* (2013.01); *B01D 2253/108* (2013.01); *B01D 2255/802* (2013.01); *B01D 2257/106* (2013.01); *B01D 2257/302* (2013.01); *B01D 2257/502* (2013.01); *B01D 2257/708* (2013.01); *B01D 2257/91* (2013.01); *B01D 2279/40* (2013.01)

(56) References Cited

U.S. PATENT DOCUMENTS

| | | | |
|---|---|---|---|
| 2015/0297771 A1* | 10/2015 | Law | B01D 53/885 423/210 |
| 2016/0121255 A1* | 5/2016 | Zhang | B01D 46/442 95/12 |
| 2020/0292438 A1 | 9/2020 | Mou et al. | |
| 2021/0208049 A1* | 7/2021 | Mou | G01N 1/24 |
| 2022/0089209 A1* | 3/2022 | Steward | B62B 9/142 |

FOREIGN PATENT DOCUMENTS

| | | | | |
|---|---|---|---|---|
| CN | 105216852 A | | 1/2016 |
| CN | 107596586 A | | 1/2018 |
| CN | 107702267 A | | 2/2018 |
| CN | 108189894 A | | 6/2018 |
| CN | 109421781 A | * | 3/2019 |
| CN | 209683789 U | | 11/2019 |
| CN | 110631181 A | | 12/2019 |
| CN | 210775135 U | | 6/2020 |
| CN | 111907582 A | * | 11/2020 |
| CN | 111998485 A | | 11/2020 |
| KR | 20180053051 | * | 5/2018 |
| KR | 10-2018-0078914 A | | 7/2018 |
| TW | I723771 B | | 4/2021 |

* cited by examiner

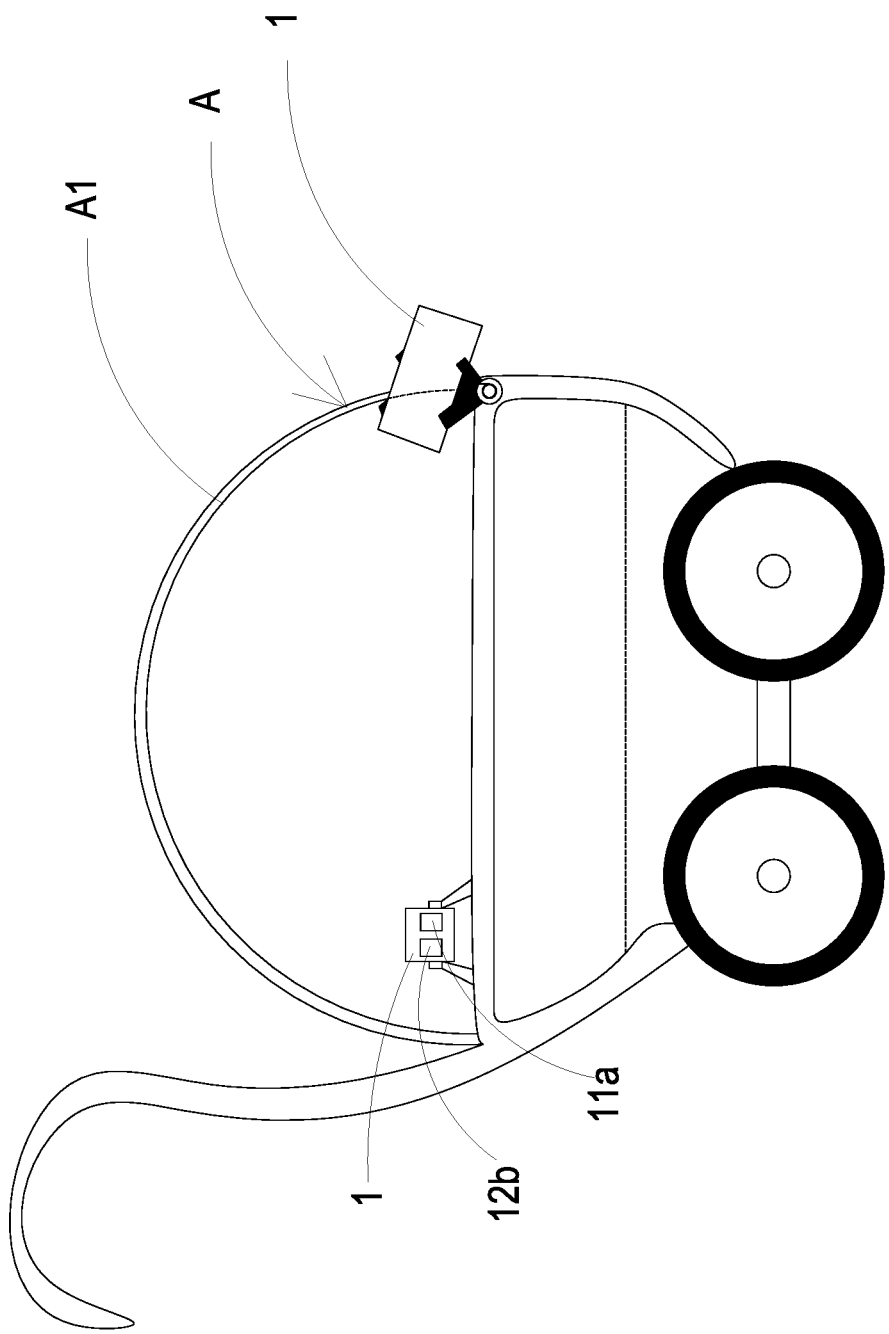

AIR POLLUTION PREVENTION DEVICE FOR BABY CARRIAGE

FIELD OF THE INVENTION

The present disclosure relates to an air pollution prevention device for a baby carriage, and more particularly to an air pollution prevention device capable of exchanging the polluted air in the baby carriage.

BACKGROUND OF THE INVENTION

A baby carriage is a device for carrying an infant. When the infant stays in the baby carriage, the outside air pollution sources is easily to be blown into the baby carriage, and the infant may breathe in the blown-in polluted air and induce respiratory diseases. One kind of baby carriage has a covering body for hooding the opening of the baby carriage so as to prevent the outside polluted air from entering into the baby carriage. However, since the opening of the baby carriage is entirely hooded by the covering body, the air inside the baby carriage is also unable to circulate with the outside air, so that the air breathed-out from the infant cannot be discharged and exchanged rapidly and will be accumulated in the baby carriage, thereby polluting the air inside the baby carriage and is harmful to the infant's health.

Air pollution sources around our daily lives, e.g., Particulate Matter (PM), such as $PM_1$, $PM_{2.5}$, $PM_{10}$, gases, such as carbon dioxide, total volatile organic compounds (TVOC), formaldehyde etc., and even particulates, aerosol, bacteria, viruses etc. contained in the air, which might affect the infant's health are all existed and exposed in the environment.

Therefore, providing a solution capable of purifying and improving the air quality to prevent the infant in the baby carriage from breathing harmful air and monitoring the air quality in the baby carriage in real time is an issue of concern developed in the present disclosure.

SUMMARY OF THE INVENTION

In view of the drawbacks described above, the present disclosure provides an air pollution prevention device for a baby carriage. The major object of the present disclosure is to provide an intelligent control and process device capable of intelligently selecting to filter and exchange the air pollution source in the baby carriage so as to generate a clean air.

To achieve the object mentioned above, the present disclosure provides an air pollution prevention device for exchanging and filtering an air pollution source in a baby carriage including a sealing cover, at least one filtration cleaner, at least one gas detection module and at least one intelligent control and process device. The air pollution prevention device for the baby carriage includes a sealing cover hooding on the baby carriage and forming a sealed space in the baby carriage and is capable of opening up or sealing off the baby carriage. The at least one filtration cleaner is disposed around the baby carriage and partially penetrates the sealing cover from the outside thereof for introducing an outside air into the baby carriage and discharging an air pollution source out of the baby carriage. The at least one gas detection module detects the air pollution source and outputs gas detection data. The at least one intelligent control and process device receives and compares the gas detection data and intelligently selects to enable a gas guider in the gas-inlet channel or the gas-outlet channel of the filtration cleaner for filtering and exchanging the air pollution source in the baby carriage so as to generate a clean air under a monitored condition.

BRIEF DESCRIPTION OF THE DRAWINGS

The above contents of the present disclosure will become more readily apparent to those ordinarily skilled in the art after reviewing the following detailed description and accompanying drawings, in which:

FIG. 1A is a schematic view illustrating the air pollution prevention device for a baby carriage under usage according to an embodiment of the present disclosure;

DETAILED DESCRIPTION OF THE PREFERRED EMBODIMENT

Figure 1B:
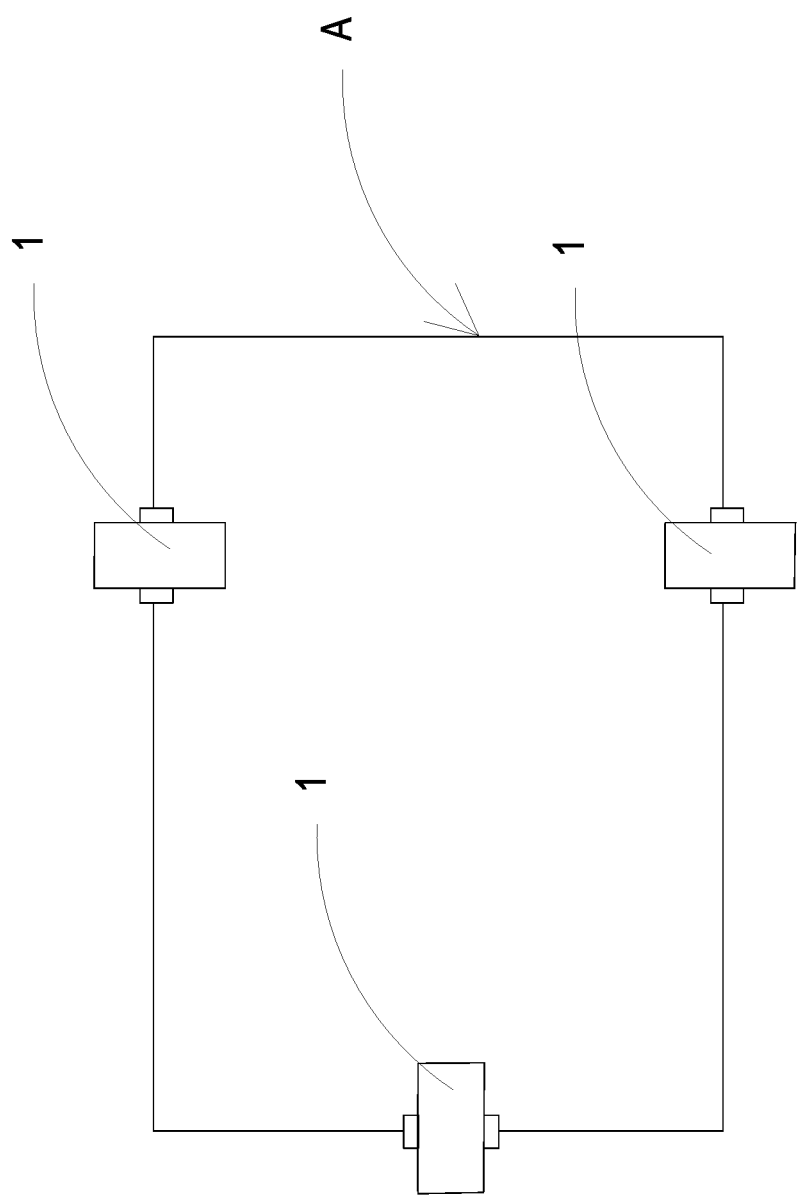
FIG. 1B is a schematic view illustrating the air pollution prevention device for a baby carriage under usage according to the embodiment of the present disclosure from another viewing angle.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Please refer to FIGS. 1A to 2B. An air pollution prevention device for a baby carriage of the present disclosure is adapted for exchanging and filtering a pollution source in a baby carriage A. The air pollution prevention device for the baby carriage includes a sealing cover A1, a filtration cleaner 1, at least one gas detection module 2 and at least one intelligent control and process device 3.

The sealing cover A1 is hooded on the baby carriage A and capable of opening up or sealing off the baby carriage so as to generate a sealed space in the baby carriage A. In some embodiments, the sealing cover A1 has a transparent covering body made from the material of glass or high molecular polymer.

The at least one filtration cleaner 1 is disposed around the baby carriage A and partially penetrating the sealing cover A1 for introducing the outside air into the sealed space of the baby carriage A and discharging the air pollution source out of the sealed space of the baby carriage A. Further, the filtration cleaner 1 includes a gas-inlet channel 11 and a gas-outlet channel 12. The opposite sides of the gas-inlet channel 11 and the opposite sides of the gas-outlet channel 12 respectively have a gas entrance 11a, 12a and a gas exit 11b, 12b. Each of the gas-inlet channel 11 and the gas-outlet channel 12 has a gas guider C and a filtering and purifying component D disposed therein. The gas entrance 11a and the gas exit 11b are respectively disposed at opposite sides of the gas-inlet channel 11, and the gas entrance 12a and the gas exit 12b are respectively disposed at opposite sides of the gas-outlet channel 12. Further, each of the gas-inlet channel 11 and the gas-outlet channel 12 has one gas guider C and one filtering and purifying components D disposed therein. When the gas guider C in the gas-inlet channel 11 is enabled, the air outside the baby carriage A is inhaled through the gas entrance 11a, filtered by the filtering and purifying component D, and introduced into the sealed space of the baby carriage A through the gas exit 11b. When the gas guider C in the gas-outlet channel 12 is enabled, the air pollution source in the sealed space of the baby carriage A is inhaled through the gas entrance 12a, filtered by the filtering and purifying component D, and discharged out of the baby carriage A through the gas exit 12b.

The at least one gas detection module 2 is disposed at the gas entrances 11a, 12a and the gas exits 11b, 12b respectively of the gas-inlet channel 11 and the gas-outlet channel 12 for detecting the outside air and the air pollution source inside the baby carriage A so as to output gas detection data. The gas detection module 2 also controls the enablement of the guider C in the gas-inlet channel 11 and/or the gas-outlet channel 12. For example, preferably but not exclusively, the gas detection modules 2 are disposed respectively at the gas entrance 11a of the gas-inlet channel 11 and at the gas exit 12b of the gas-outlet channel 12 for detecting the gas outside the baby carriage A, or alternatively, the gas detection modules 2 are disposed respectively at the gas exit 11b of the gas-inlet channel 11 and at the gas entrance 12a of the gas-outlet channel 12 for detecting the air pollution source inside the baby carriage A.

The at least one intelligent control and process device 3 is used for receiving the gas detection data outputted by the gas detection module 2 so as to intelligently select to send a driving command In the embodiment, after receiving and comparing the gas detection data, the intelligent control and process device 3 intelligently selects to enable the gas guider C in the gas-inlet channel 11 or the gas-outlet channel 12 of the filtration cleaner 1, so that the air pollution source in the baby carriage A is filtered and exchanged to generate a clean air under a monitored condition.

Furthermore, the intelligent control and process device 3 is connected with a could processing device 4 for transmitting the received gas detection data to the cloud processing device 4. In the embodiment, the could processing device 4 compares and intelligently computes the received gas detection data for sending the driving command to the intelligent control and process device 3 for further transmitting to the gas detection modules 2, so as to drive the enablement of the gas guider C in the gas-inlet channel 11 or the gas-outlet channel 12 of the filtration cleaner 1, so as to allow the air pollution source in the baby carriage A to be filtered and exchanged and generate a clean air under a monitored condition, thereby ensuring the filtering and purifying component D of the filtration cleaner 1 is able to filter the air outside the baby carriage A and generate a clean air introduced into the baby carriage A. In some embodiments, the intelligent control and process device 3 is one of a portable mobile device and a wearable device. In some other embodiments, the intelligent control and process device 3 includes a display for displaying the gas detection data inside the baby carriage A.

In some embodiments, when the gas detection data detected by the gas detection modules 2 at the gas exit 11b of the gas-inlet channel 11 and at the gas entrance 12a of the gas-outlet channel 12 of the filtration cleaner 1 is higher than the gas detection data detected by the gas detection modules 2 at the gas entrance 11a of the gas-inlet channel 11 and at the gas exit 12b of the gas-outlet channel 12, the intelligent control and process device 3 intelligently selects to enable the gas guiders C in the gas-inlet channel 11 and the gas-outlet channel 12 of the filtration cleaner 1. As a result, the air outside the baby carriage A is inhaled through the gas entrance 11a of the gas-inlet channel 11, filtered by the filtering and purifying component D, and introduced into the baby carriage A through the gas exit 11b. As the gas guider C in the gas-outlet channel 12 is enabled, the air pollution source inside the baby carriage A is inhaled through the gas entrance 12a, filtered by the filtering and purifying component D, and discharged out of the baby carriage A through the gas exit 12b. Accordingly, the air pollution source inside the baby carriage A can be filtered and exchanged to generate a clean air under a monitored condition. Here, the monitored condition refers to that the gas detection data of the air pollution source inside the baby carriage A is continuously detected by the gas detection module 2 to make sure that the gas detection data does not exceed a safety detection value. In the embodiment, the safety detection value includes 0-5 μg/m³ of the value of $PM_{2.5}$, less than 1000 ppm of the carbon dioxide ($CO_2$) content, less than 0.56 ppm of the total volatile organic compounds (TVOC) content, less than 0.08 ppm of the formaldehyde (HCHO) content, less than 1500 $CFU/m^3$ of the amount of bacteria, less than 1000 $CFU/m^3$ of the amount of fungi, less than 0.075 ppm of the sulfur dioxide content, less than 0.1 ppm of the nitrogen dioxide content, less than 9 ppm of the carbon monoxide content, less than 0.06 ppm of the ozone content, and less than 0.15 μg/m³ of the value of lead. The air pollution source is one selected from the group consisting of particulate matter, carbon monoxide, carbon dioxide, ozone, sulfur dioxide, nitrogen dioxide, lead, total volatile organic compounds, formaldehyde, bacteria, fungi, virus and a combination thereof.

Moreover, in some embodiments, a plurality of filtration cleaners 1 are disposed around the baby carriage A, and the intelligent control and process device 3 receives and compares the gas detection data inside the baby carriage A detected by at least three gas detection modules 2 so as to execute an intelligent computation to locate the position of the air pollution source in the baby carriage A, thereby intelligently selecting to enable the gas guider C in the gas-outlet channel 12 of the filtration cleaner 1 nearest the pollution source, thereby accelerating the inhalation of the air pollution source through the gas entrance 12a of the gas-outlet channel 12 before diffusion.

In some other embodiments, a plurality of filtration cleaners 1 are disposed around the baby carriage A, and the intelligent control and process device 3 receives and compares the gas detection data inside the baby carriage A detected by at least three gas detection modules 2 so as to execute an intelligent computation to locate the position of the air pollution source in the baby carriage A, thereby intelligently selecting to preferentially enable the gas guider C in the gas-outlet channel 12 of the filtration cleaner 1 nearest the pollution source. At the same time, the intelligent control and process device 3 also selects to enable the gas guiders C in the gas-inlet channels 11 of the other filtration cleaners 1 under the intelligent computation for generating an airflow to guide and direct the air pollution source toward the gas guider C of the filtration cleaner 1 nearest the air pollution source to be filtered fastly.

Figure 2A:
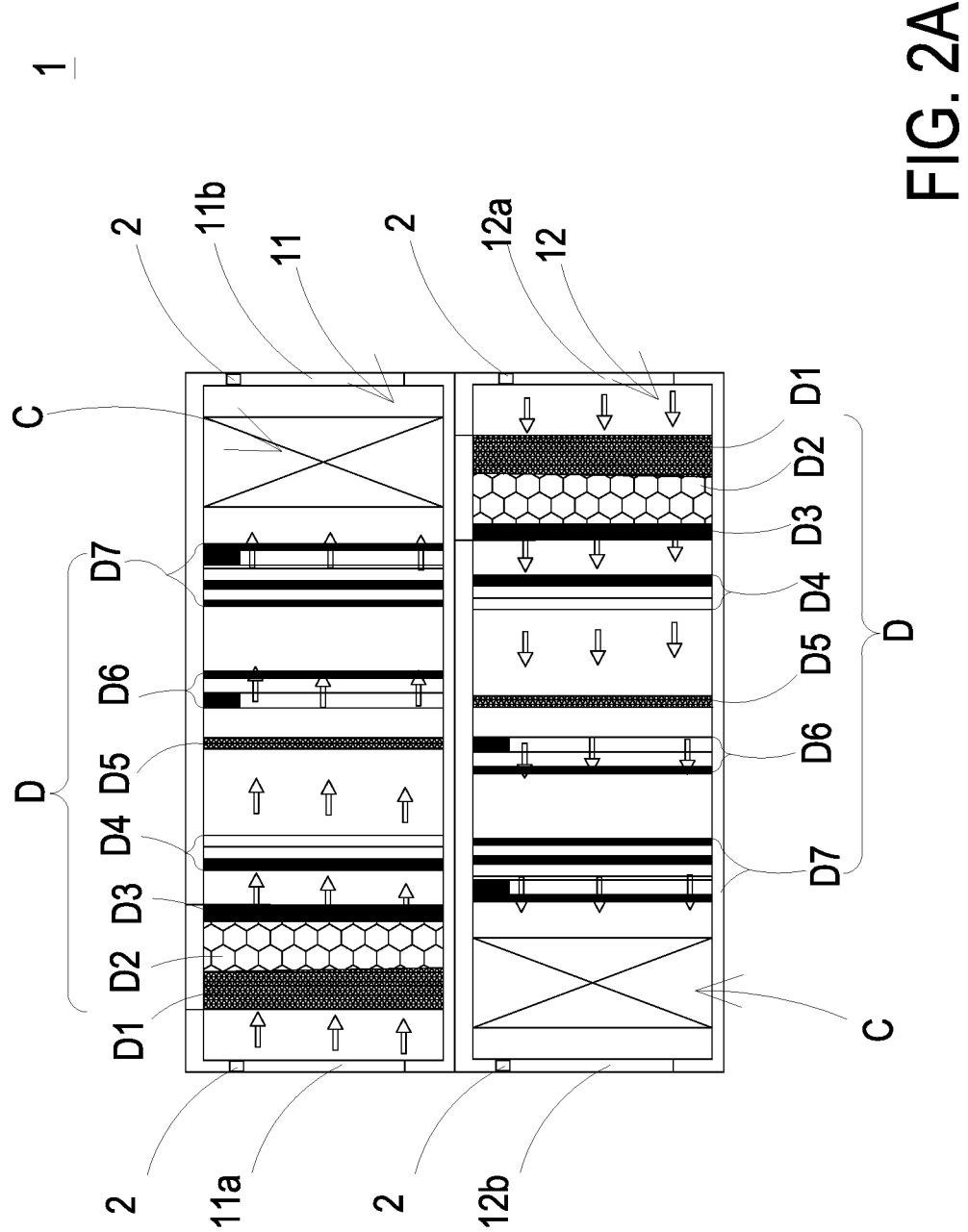
FIG. 2A is a schematic cross-sectional view illustrating an air filtration cleaner used in the baby carriage according to an embodiment of the present disclosure
Figure 2B:
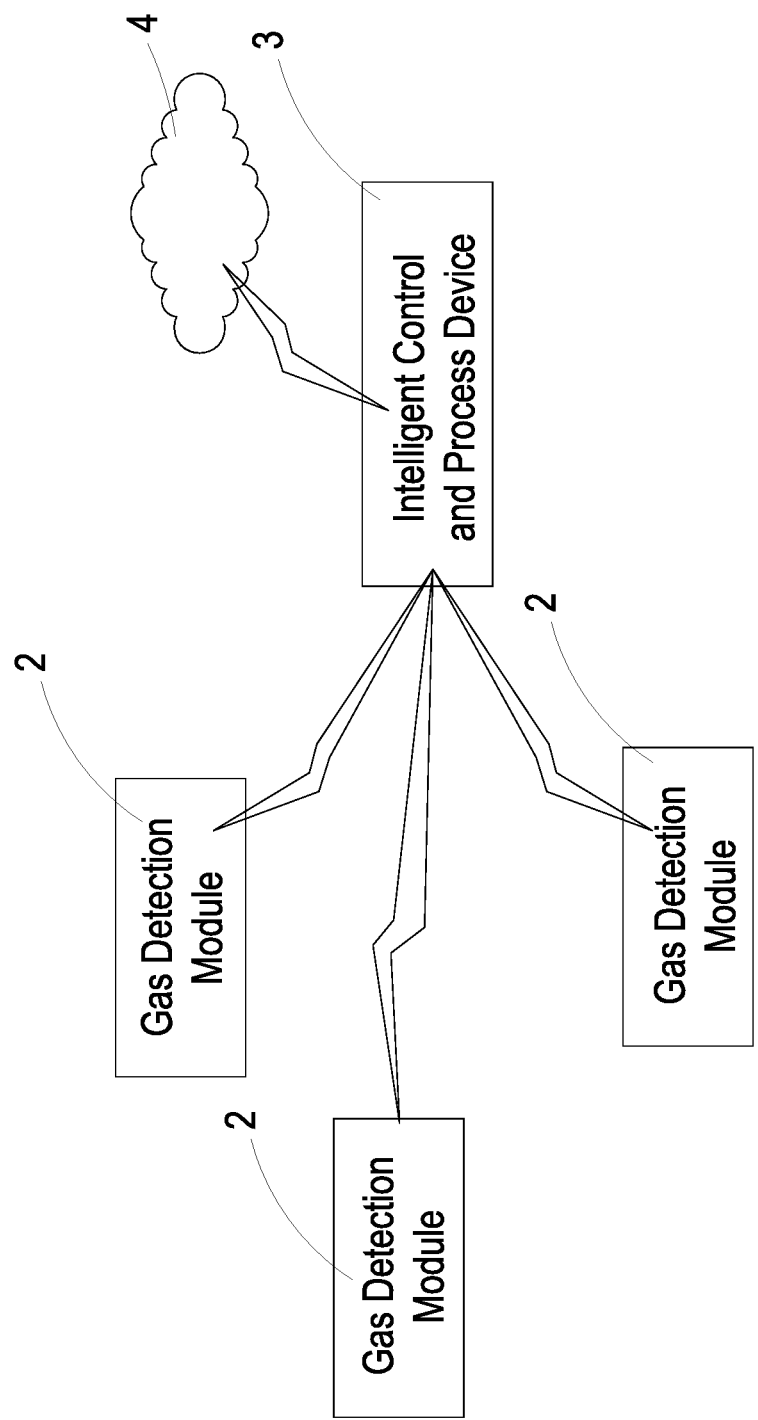
FIG. 2B is a schematic view illustrating the connections among a gas detection module, an intelligent control and process device and a cloud processing device according to an embodiment of the present disclosure.
Figure 3:
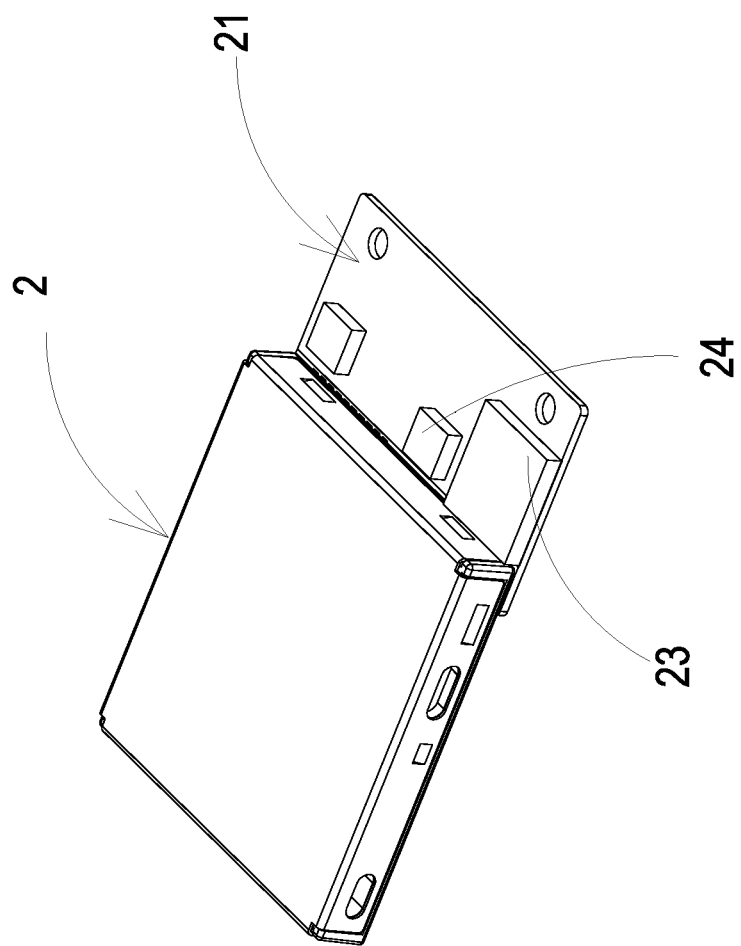
FIG. 3 is a schematic view illustrating an assembled gas detection module according to an embodiment of the present disclosure.
Figure 4A:
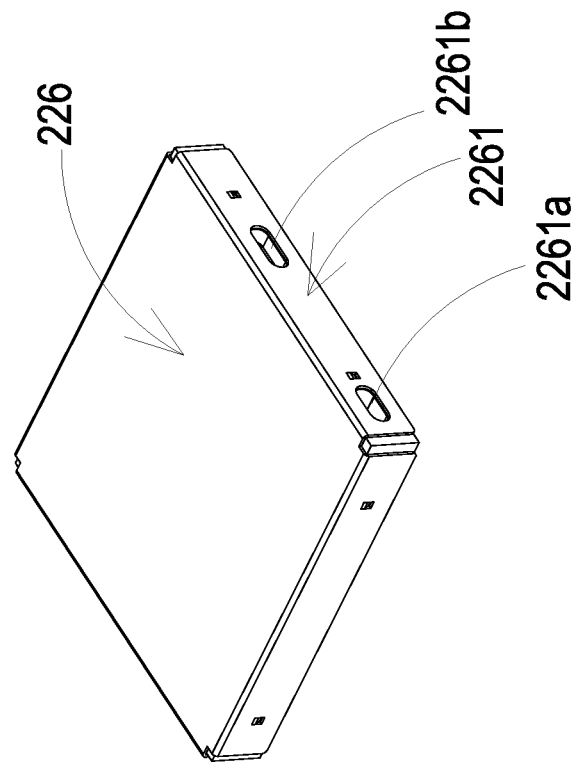
FIG. 4A is a schematic view illustrating an assembled gas detection main body according to an embodiment of the present disclosure.
Figure 4B:
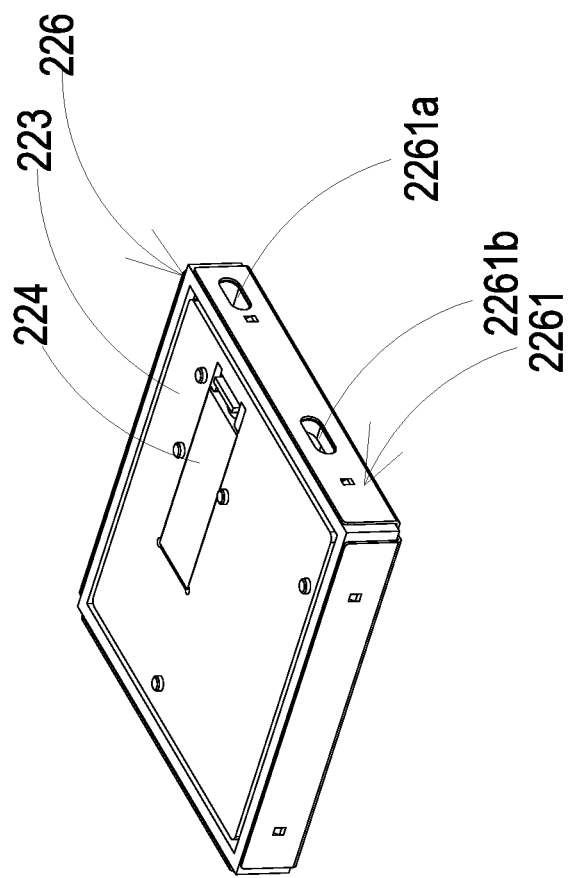
FIG. 4B is a schematic view illustrating the assembled gas detection main body according to the embodiment of the present disclosure from another viewing angle.
Figure 4C:
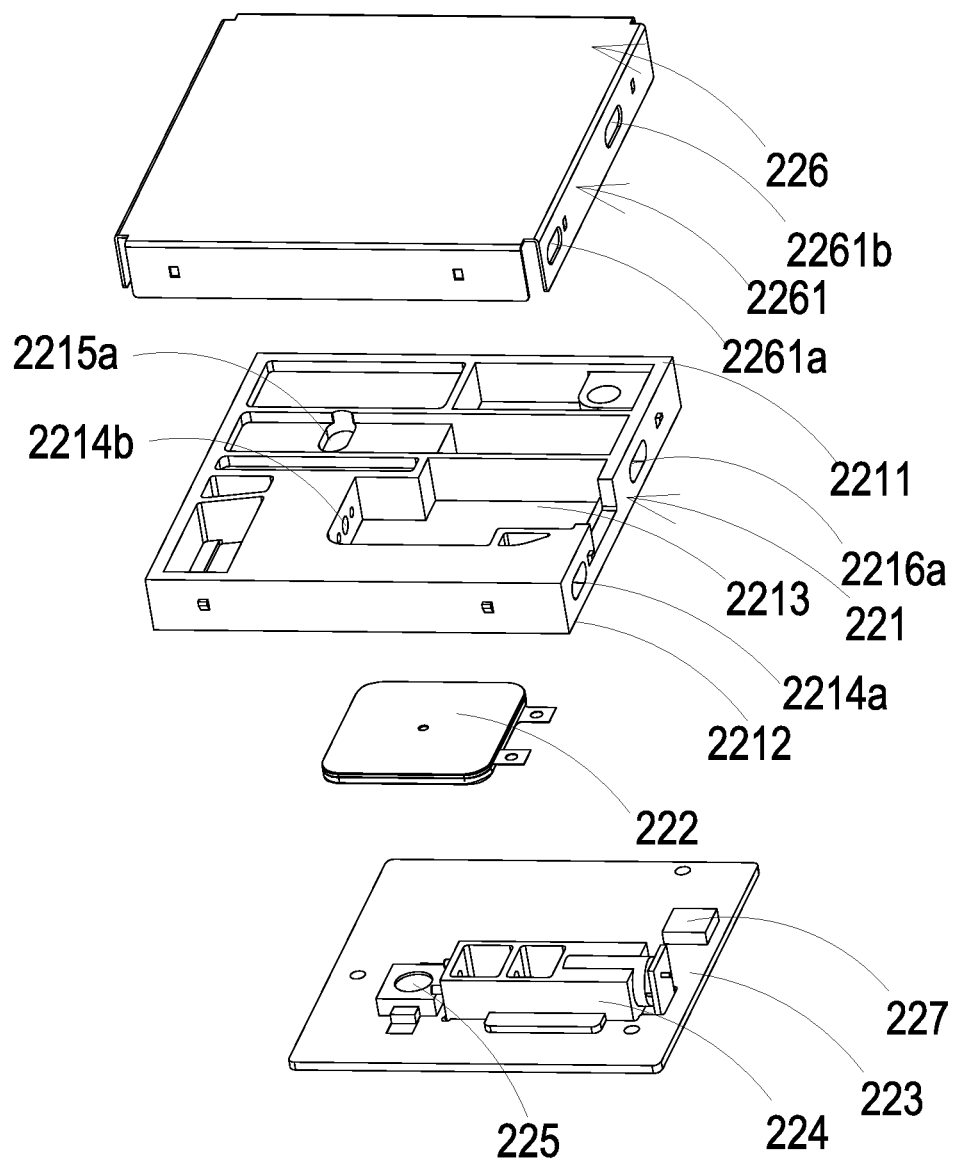
FIG. 4C is a schematic exploded view illustrating the gas detection main body according to the embodiment of the present disclosure.
Figure 5A:
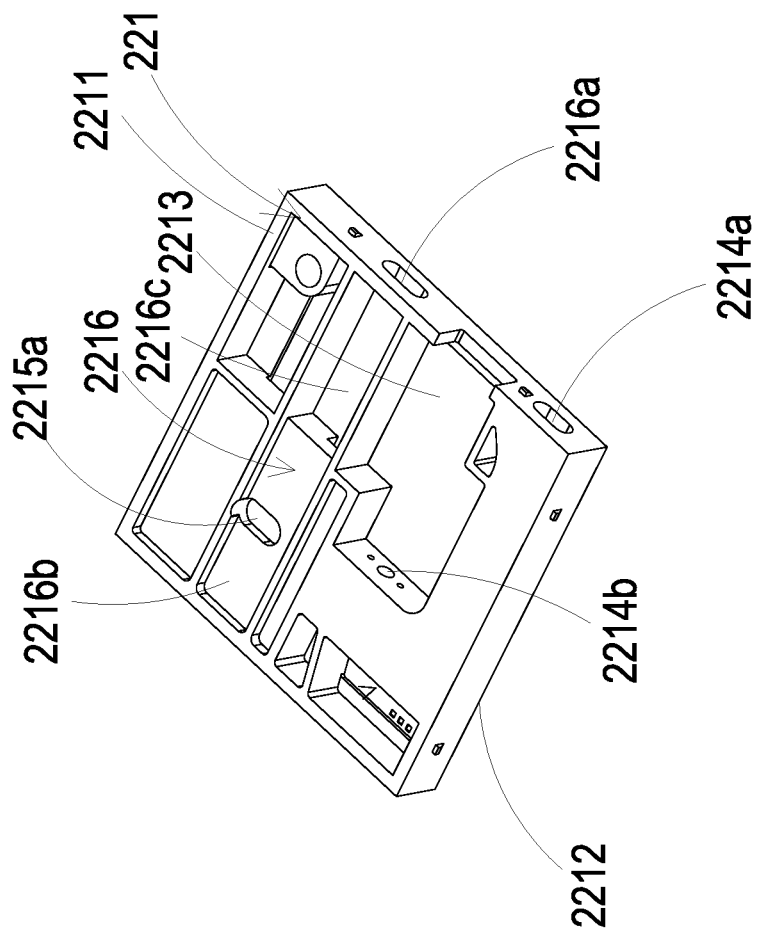
FIG. 5A is a schematic view illustrating a base according to an embodiment of the present disclosure.
Figure 5B:
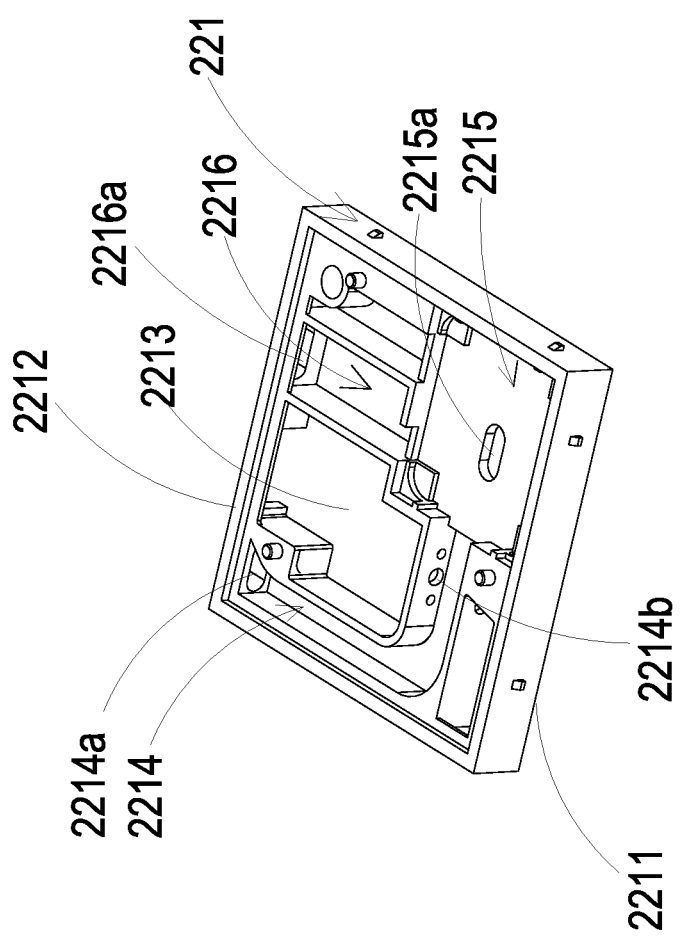
FIG. 5B is a schematic view illustrating the base according to the embodiment of the present disclosure from another viewing angle.
Figure 6:
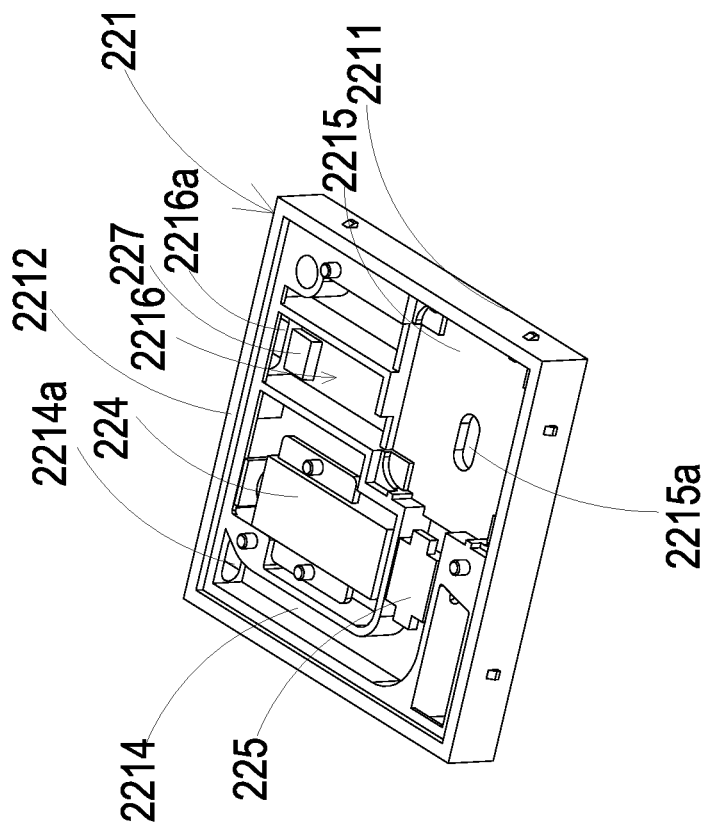
FIG. 6 is a schematic view illustrating a laser component received within the base according to an embodiment of the present disclosure.
Figure 7A:
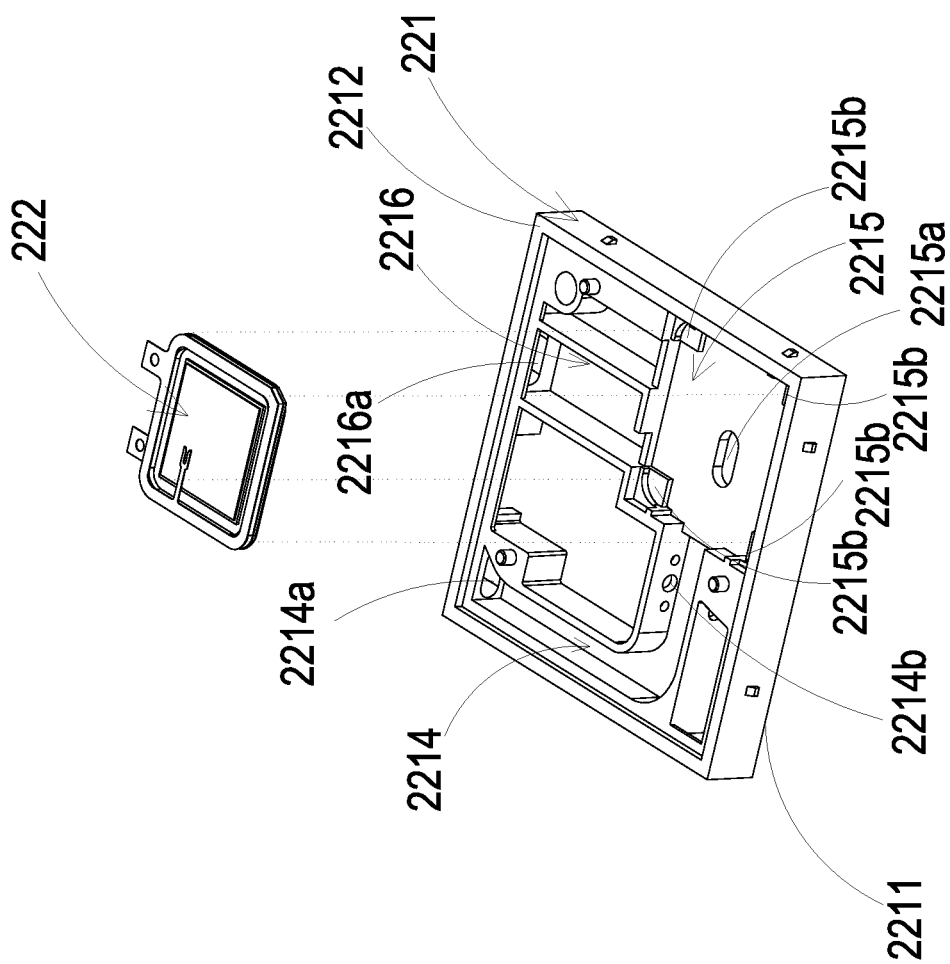
FIG. 7A is a schematic exploded view illustrating a piezoelectric actuator and the base according to an embodiment of the present disclosure.
Figure 7B:
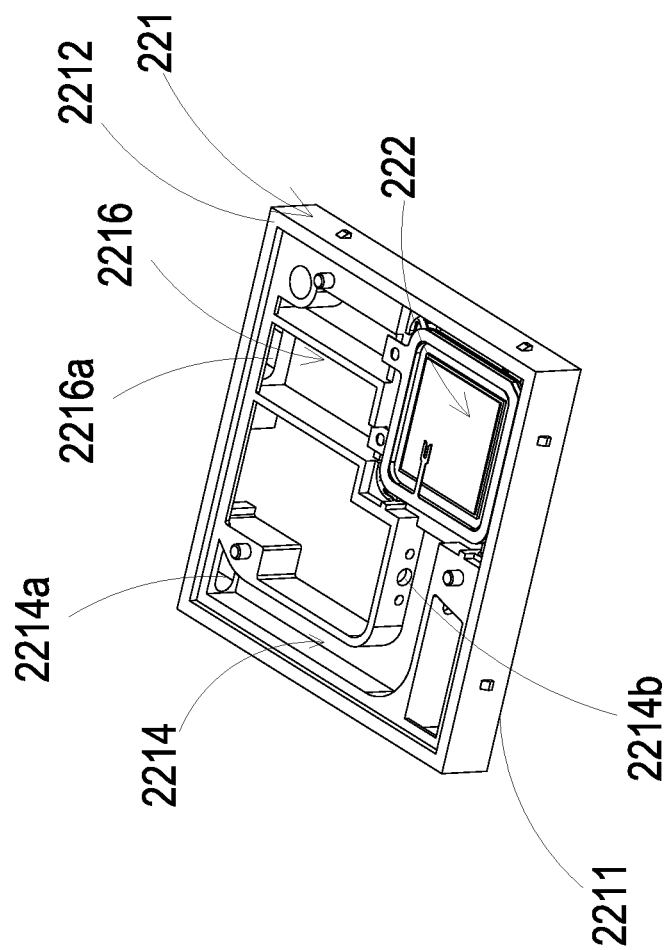
FIG. 7B is a schematic view illustrating the combination of the piezoelectric actuator and the base according to the embodiment of the present disclosure.
Figure 8A:
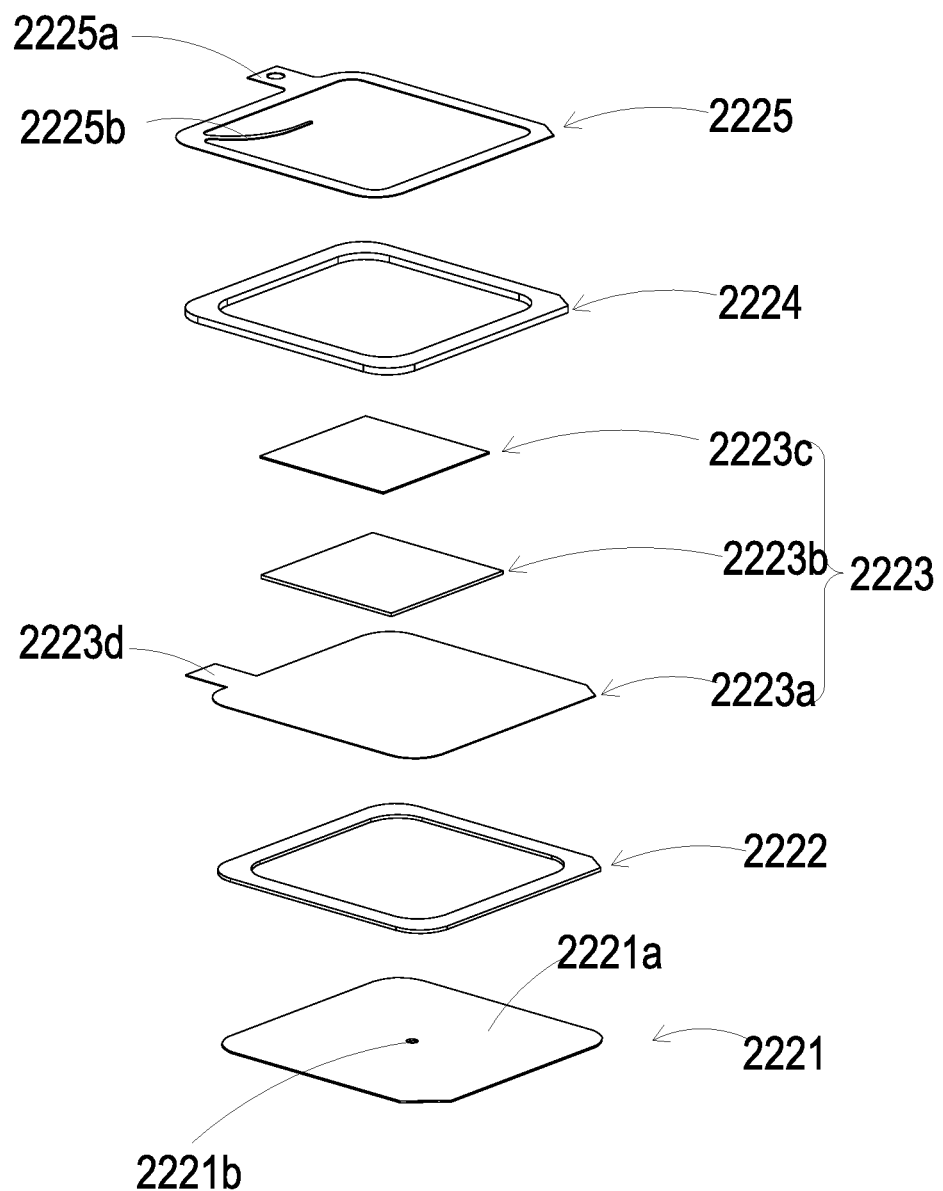
FIG. 8A is a schematic exploded view illustrating the piezoelectric actuator according to an embodiment of the present disclosure.
Figure 8B:
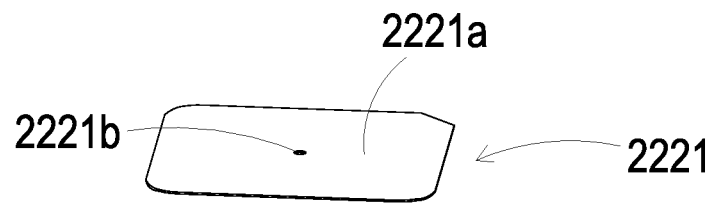
FIG. 8B is a schematic exploded view illustrating the piezoelectric actuator according to the embodiment of the present disclosure from another viewing angle.
Figure 8B:
Figure 8B:
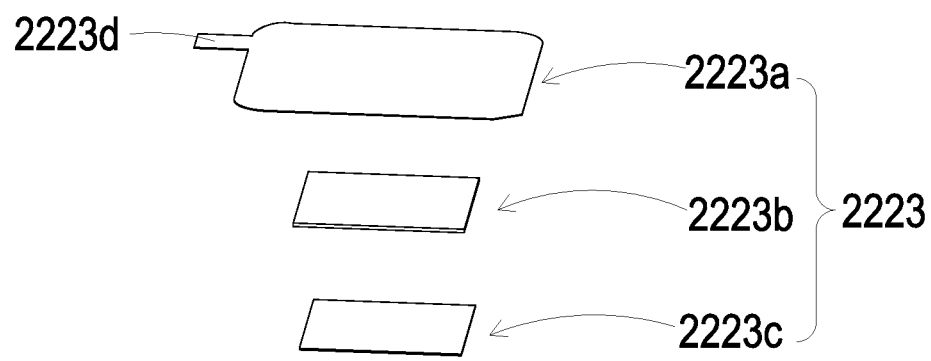
Figure 8B:
Figure 8B:
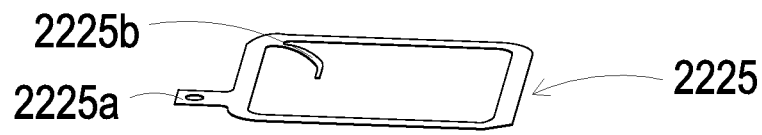

Please refer to FIG. 2A. The filtering and purifying component D mentioned above can be a combination of various implementations. In some embodiments, the filtering and purifying component D includes an activated carbon filter screen D1 and a high-efficiency particulate air (HEPA) filter screen D2, or an activated carbon filter screen D1, a high-efficiency particulate air (HEPA) filter screen D2 and a zeolite filter screen D3. The activated carbon layer D1 filters and absorbs particulate matter ($PM_{2.5}$), the zeolite layer D3 filters and absorbs volatile organic compounds (VOCs), and the high-efficiency particulate air filter screen D2 adsorbs the chemical smoke, bacteria, dust particles and pollen contained in the gas, so as to achieve the effects of filtering and purifying the polluted gas introduced into the filtering and purifying component D. In some embodiments, the high efficiency particulate air filter screen D2 is coated with a cleansing factor containing chlorine dioxide to inhibit viruses, bacteria and fungi contained in the gas introduced into the filtering and purifying component D. In the embodiment, the high efficiency particulate air filter screen D2 is coated with a layer of a cleansing factor containing chlorine dioxide to inhibit viruses, bacteria, fungi, influenza A virus, influenza B virus, enterovirus or norovirus in the polluted gas introduced into the filtering and purifying component D, and the inhibition rate can reach more than 99% which is helpful of reducing the cross-infection of viruses. In other embodiments, the high efficiency particulate air filter screen D2 is coated with an herbal protective layer extracted from ginkgo and Japanese rhus chinensis to form an herbal protective anti-allergic filter, so as to resist allergy effectively and destroy a surface protein of influenza virus (such as H1N1 influenza virus) in the gas introduced into the filtering and purifying component D and passing through the high efficiency particulate air filter screen D2. In some other embodiments, the high efficiency particulate air filter screen D2 is coated with a layer of silver ions to inhibit viruses, bacteria and fungi contained in the introduced gas.

In some other embodiments, the filtering and purifying component D includes an activated carbon filter screen D1, a high-efficiency particulate air filter screen D2 and a zeolite filter screen D3 combined with a photo-catalyst unit D4. Therefore, when the polluted gas outside the baby carriage A is introduced into the filtering and purifying component D, the photo-catalyst unit D4 converts light energy into chemical energy to decompose harmful materials and disinfect bacteria contained in the gas, so as to achieve the effects of filtering and purifying the introduced gas.

In some other embodiments, the filtering and purifying component D includes an activated carbon filter screen D1, a high-efficiency particulate air filter screen D2 and a zeolite filter screen D3 combined with a photo-plasma unit D5. The photo-plasma unit D5 includes a nanometer irradiation tube. The polluted gas introduced by the filtering and purifying component D is irradiated by the nanometer irradiation tube to decompose volatile organic gases contained in the polluted gas and purify the polluted gas. When the polluted gas is introduced by the filtering and purifying component D, the gas is irradiated by the nanometer irradiation tube, so as to decompose the oxygen molecules and water molecules contained in the gas into high oxidizing photo-plasma, thereby generating an ion flow capable of destroying organic molecules, and decomposing volatile formaldehyde, volatile toluene and volatile organic compounds (VOC) contained in the gas into water and carbon dioxide, so as to achieve the effects of filtering and purifying the introduced gas.

In some other embodiments, the filtering and purifying component D includes an activated carbon filter screen D1, a high-efficiency particulate air filter screen D2 and a zeolite filter screen D3 combined with a negative ionizer D6. Therefore, when the polluted gas is introduced into the filtering and purifying component D, a discharged high voltage makes the suspended particles in the gas to carry positive charge and adhere to a dust collecting plate carrying negative charge, so as to achieve the effects of filtering and purifying the introduced gas.

In some other embodiments, the filtering and purifying component D includes an activated carbon filter screen D1, a high-efficiency particulate air filter screen D2 and a zeolite filter screen D3 combined with a plasma ion unit D7. The plasma ion unit D7 generates a high-voltage plasma column with plasma ion, and the plasma ion of the high-voltage plasma column decomposes viruses and bacteria contained in the polluted gas outside the baby carriage A introduced into the filtering and purifying component D. Through the plasma ion, oxygen molecules and water molecules contained in the gas are decomposed into positive hydrogen ions ($H^+$) and negative oxygen ions ($O^{2-}$). The substances attached with water molecules around the ions are adhered on the surface of viruses and bacteria and converted into OH radicals with extremely strong oxidizing power, thereby removing hydrogen from the protein on the surface of viruses and bacteria, and thus oxidizing and decomposing the protein, so as to filter the introduced gas and achieve the effects of filtering and purifying the gas.

In some embodiments, the filtering and purifying component D may only contain the high-efficiency particulate air filter screen D2. In some other embodiments, the filtering and purifying component D includes the high-efficiency particulate air filter screen D2 combined with any one of the photo-catalyst unit D4, the photo-plasma unit D5, the negative ionizer D6 and the plasma ion unit D7. In some other embodiments, the filtering and purifying component D includes the high-efficiency particulate air filter screen D2 combined with any two of the photo-catalyst unit D4, the photo-plasma unit D5, the negative ionizer D6 and the plasma ion unit D7. In some other embodiments, the filtering and purifying component D includes the high-efficiency particulate air filter screen D2 combined with any three of the photo-catalyst unit D4, the photo-plasma unit D5, the negative ionizer D6 and the plasma ion unit D7. In some other embodiments, the filtering and purifying component D includes the high-efficiency particulate air filter screen D2 combined with all of the photo-catalyst unit D4, the photo-plasma unit D5, the negative ionizer D6 and the plasma ion unit D7.

After understanding the operation of the air pollution prevention device for the baby carriage, followings are the detailed explanations of the gas transmission within the gas detection module 2 according to the present disclosure.

Please refer to FIG. 3 to FIG. 9A. The gas detection module 2 includes a control circuit board 21, a gas detection main body 22, a microprocessor 23 and a communicator 24. The gas detection main body 22, the microprocessor 23 and the communicator 24 are integrally packaged on the control circuit board 21 and electrically connected therewith, and the microprocessor 23 and the communicator 24 are disposed on the control circuit board 23. The microprocessor 23 controls a driving signal for initiating a detection operation of the gas detection main body 22, performs an external communication through the communicator 24, and converts (gas) detection information from the gas detection main body 22 into detection data for storage. The communicator 24 receives the (gas) detection data outputted by the microprocessor 23 and transmits the (gas) detection data to the cloud processing device 4 or an external device (not shown). In some embodiments, the external device is a portable mobile device (not shown). The external transmission of the communicator 24 can be a bidirectional wired communication, e.g., through USB, mini-USB, micro-USB etc., or a bidirectional wireless communication, e.g., through a Wi-Fi module, a Bluetooth module, a radio frequency identification module, a near field communication module etc.

The gas detection main body 22 mentioned above includes a base 221, a piezoelectric actuator 222, a driving circuit board 223, a laser component 224, a particulate sensor 225, an outer cover 226 and a gas sensor 227. The base 221 includes a first surface 2211, a second surface 2212, a laser loading region 2213, a gas-inlet groove 2214, a gas-guiding-component loading region 2215 and a gas-outlet groove 2216. In the embodiment, the first surface 2211 and the second surface 2212 are two surfaces opposite to each other. In the embodiment, the laser loading region 2213 is hollowed out from the first surface 2211 to the second surface 2212. The outer cover 226 covers the base 221 and includes a lateral plate 2261. The lateral plate 2261 includes an inlet opening 2261a and an outlet opening 2261b. The gas-inlet groove 2214 is concavely formed from the second surface 2212 and disposed adjacent to the laser loading region 2213. The gas-inlet groove 2214 includes a gas-inlet 2214a in communication with an environment outside the base 221, and is spatially corresponding in position to the inlet opening 2261a of the outer cover 226. The gas-inlet 2214a includes two transparent windows 2214b opened on two lateral walls thereof and is in communication with the laser loading region 2213. Therefore, when the first surface 2211 of the base 221 is attached and covered by the outer cover 226, and the second surface 2212 of the base 221 is attached and covered by the driving circuit board 223, an inlet path is collaboratively defined by the gas-inlet groove 2214, the outer cover 226, and the driving circuit board 223.

In the embodiment, the gas-guiding-component loading region 2215 is concavely formed from the second surface 2212 and in communication with the gas-inlet groove 2214. A ventilation hole 2215a penetrates a bottom surface of the gas-guiding-component loading region 2215, and four corners of the gas-guiding-component loading region 2215 respectively have a positioning protrusion 2215b disposed thereon. In the embodiment, the gas-outlet groove 2216 includes a gas-outlet 2216a, and the gas-outlet 2216a is spatially corresponding to the outlet opening 2261b of the outer cover 226. The gas-outlet groove 2216 includes a first section 2216b and a second section 2216c. The first section 2216b is concavely formed from a region of the first surface 2211 spatially corresponding to a vertical projection area of the gas-guiding-component loading region 2215. The second section 2216c is hollowed out from the first surface 2211 to the second surface 2212 in a region misaligned with the vertical projection area of the gas-guiding-component loading region 2215 and extended therefrom. The first section 2216b and the second section 2216c are connected to form a stepped structure. Moreover, the first section 2216b of the gas-outlet groove 2216 is in communication with the ventilation hole 2215a of the gas-guiding-component loading region 2215, and the second section 2216c of the gas-outlet groove 2216 is in communication with the gas-outlet 2216a. In that, when the first surface 2211 of the base 221 is attached and covered by the outer cover 226 and the second surface 2212 of the base 221 is attached and covered by the driving circuit board 223, the gas-outlet groove 2216, the outer cover 226 and the driving circuit board 223 collaboratively define an outlet path.

Moreover, the laser component 224 and the particulate sensor 225 mentioned above are disposed on the driving circuit board 223 and located within the base 221. In order to clearly describe and illustrate the positions of the laser component 224 and the particulate sensor 225 in the base 221, the driving circuit board 223 is intentionally omitted. The laser component 224 is accommodated in the laser loading region 2213 of the base 221, and the particulate sensor 225 is accommodated in the gas-inlet groove 2214 of the base 221 and aligned to the laser component 224. In addition, the laser component 224 is spatially corresponding to the transparent window 2214b, thereby a light beam emitted by the laser component 224 passes through the transparent window 2214b and irradiates into the gas-inlet groove 2214. Furthermore, the light beam path extends from the laser component 224 and passes through the transparent window 2214b in an orthogonal direction perpendicular to the gas-inlet groove 2214. In the embodiment, a projecting light beam emitted from the laser component 224 passes through the transparent window 2214b and enters the gas-inlet groove 2214 to irradiate the gas in the gas-inlet groove

2214. When the suspended particles contained in the gas are irradiated and generate scattered light spots, the scattered light spots are detected and calculated by the particulate sensor 225, which is in an orthogonal direction perpendicular to the gas-inlet groove 2214, for obtaining the detection data of the gas. In addition, the gas sensor 227 is positioned and disposed on the driving circuit board 223 and electrically connected to the driving circuit board 223, and is accommodated in the gas-outlet groove 2216 for detecting the polluted gas guided into the gas-outlet groove 2216. In some embodiments, the gas sensor 227 includes a volatile-organic-compound sensor for detecting the information of carbon dioxide or total volatile organic compounds. In some other embodiments, the gas sensor 227 includes a formaldehyde sensor for detecting the information of formaldehyde in the gas. In some other embodiments, the gas sensor 227 includes a bacteria sensor for detecting the information of bacteria and fungi in the gas. In some other embodiments, the gas sensor 227 includes a virus sensor for detecting the information of viruses in the gas. In some other embodiments, the gas sensor 227 includes a temperature and humidity sensor for detecting the information of temperature and humidity of the gas.

The piezoelectric actuator 222 mentioned above is accommodated in the square-shaped gas-guiding-component loading region 2215 of the base 221. The gas-guiding-component loading region 2215 is in communication with the gas-inlet groove 2214. When the piezoelectric actuator 222 is enabled, the gas in the gas-inlet groove 2214 is inhaled by the piezoelectric actuator 222, so that the gas flows into the piezoelectric actuator 222 and is transported into the gas-outlet groove 2216 through the ventilation hole 2215*a* of the gas-guiding-component loading region 2215. Moreover, the driving circuit board 223 mentioned above attaches and covers to the second surface 2212 of the base 221, and the laser component 224 is positioned and disposed on the driving circuit board 223 and electrically connected to the driving circuit board 223. The particulate sensor 225 also is positioned and disposed on the driving circuit board 223 and electrically connected to the driving circuit board 223. When the outer cover 226 covers the base 221, the inlet opening 2261*a* is spatially corresponding to the gas-inlet 2214*a* of the base 221, and the outlet opening 2261*b* is spatially corresponding to the gas-outlet 2216*a* of the base 221.

The piezoelectric actuator 222 mentioned above includes a gas-injection plate 2221, a chamber frame 2222, an actuator element 2223, an insulation frame 2224 and a conductive frame 2225. In the embodiment, the gas-injection plate 2221 is made by a flexible material and includes a suspension plate 2221*a* and a hollow aperture 2221*b*. The suspension plate 2221*a* is a sheet structure and is permitted to undergo a bending deformation. Preferably but not exclusively, the shape and the size of the suspension plate 2221*a* are corresponding to the inner edge of the gas-guiding-component loading region 2215, but not limited thereto. The hollow aperture 2221*b* passes through a center of the suspension plate 2221*a*, so as to allow the gas to flow therethrough. Preferably but not exclusively, the shape of the suspension plate 2221*a* is selected from the group consisting of a square, a circle, an ellipse, a triangle and a polygon.

The chamber frame 2222 mentioned above is carried and stacked on the gas-injection plate 2221. The shape of the chamber frame 2222 is corresponding to the gas-injection plate 2221. The actuator element 2223 is carried and stacked on the chamber frame 2222 and collaboratively defines a resonance chamber 2226 with the gas-injection plate 2221 and the suspension plate 2221*a*. The insulation frame 2224 is carried and stacked on the actuator element 2223 and the appearance of the insulation frame 2224 is similar to that of the chamber frame 2222. The conductive frame 2225 is carried and stacked on the insulation frame 2224, and the appearance of the conductive frame 2225 is similar to that of the insulation frame 2224. In addition, the conductive frame 2225 includes a conducting pin 2225*a* extended outwardly from an outer edge of the conductive frame 2225 and a conducting electrode 2225*b* extended inwardly from an inner edge of the conductive frame 2225.

Moreover, the actuator element 2223 further includes a piezoelectric carrying plate 2223*a*, an adjusting resonance plate 2223*b* and a piezoelectric plate 2223*c*. The piezoelectric carrying plate 2223*a* is carried and stacked on the chamber frame 2222. The adjusting resonance plate 2223*b* is carried and stacked on the piezoelectric carrying plate 2223*a*. The piezoelectric plate 2223*c* is carried and stacked on the adjusting resonance plate 2223*b*. The adjusting resonance plate 2223*b* and the piezoelectric plate 2223*c* are accommodated in the insulation frame 2224. The conducting electrode 2225*b* of the conductive frame 2225 is electrically connected to the piezoelectric plate 2223*c*. In the embodiment, the piezoelectric carrying plate 2223*a* and the adjusting resonance plate 2223*b* are made of a conductive material. The piezoelectric carrying plate 2223*a* includes a piezoelectric pin 2223*d*. The piezoelectric pin 2223*d* and the conducting pin 2225*a* are electrically connected to a driving circuit (not shown) of the driving circuit board 223, so as to receive a driving signal (which can be a driving frequency and a driving voltage). Through this structure, a circuit is formed by the piezoelectric pin 2223*d*, the piezoelectric carrying plate 2223*a*, the adjusting resonance plate 2223*b*, the piezoelectric plate 2223*c*, the conducting electrode 2225*b*, the conductive frame 2225 and the conducting pin 2225*a* for transmitting the driving signal. Moreover, the insulation frame 2224 provides insulation between the conductive frame 2225 and the actuator element 2223, so as to avoid the occurrence of a short circuit. Thereby, the driving signal is transmitted to the piezoelectric plate 2223*c*. After receiving the driving signal, the piezoelectric plate 2223*c* deforms due to the piezoelectric effect, and the piezoelectric carrying plate 2223*a* and the adjusting resonance plate 2223*b* are further driven to bend and vibrate in the reciprocating manner.

Furthermore, the adjusting resonance plate 2223*b* is located between the piezoelectric plate 2223*c* and the piezoelectric carrying plate 2223*a* and served as a cushion between the piezoelectric plate 2223*c* and the piezoelectric carrying plate 2223*a*. Thereby, the vibration frequency of the piezoelectric carrying plate 2223*a* is adjustable. Basically, the thickness of the adjusting resonance plate 2223*b* is greater than the thickness of the piezoelectric carrying plate 2223*a*, and the thickness of the adjusting resonance plate 2223*b* is adjustable to adjust the vibration frequency of the actuator element 2223 accordingly. In the embodiment, the gas-injection plate 2221, the chamber frame 2222, the actuator element 2223, the insulation frame 2224 and the conductive frame 2225 are stacked and positioned in the gas-guiding-component loading region 2215 sequentially, so that the piezoelectric actuator 222 is supported and positioned in the gas-guiding-component loading region 2215. A clearance 2221*c* is defined by the piezoelectric actuator 222 between the suspension plate 2221*a* and an inner edge of the gas-guiding-component loading region 2215 for gas flowing therethrough.

A flowing chamber 2227 is formed between the gas-injection plate 2221 and the bottom surface of the gasguiding-component loading region 2215. The flowing chamber 2227 is in communication with the resonance chamber 2226, located between the actuator element 2223, the gas-injection plate 2221 and the suspension plate 2221a, through the hollow aperture 2221b of the gas-injection plate 2221. By controlling the vibration frequency of the gas in the resonance chamber 2226 to be close to the vibration frequency of the suspension plate 2221a, the Helmholtz resonance effect is generated between the resonance chamber 2226 and the suspension plate 2221a, so as to improve the efficiency of gas transportation. When the piezoelectric plate 2223c moves away from the bottom surface of the gas-guiding-component loading region 2215, the suspension plate 2221a of the gas-injection plate 2221 is driven by the piezoelectric plate 2223c to move away from the bottom surface of the gas-guiding-component loading region 2215. In that, the volume of the flowing chamber 2227 is expanded rapidly, the internal pressure of the flowing chamber 2227 is decreased and generates a negative pressure, and the gas outside the piezoelectric actuator 222 is inhaled through the clearance 2221c and enters the resonance chamber 2226 through the hollow aperture 2221b. Consequently, the pressure in the resonance chamber 2226 is increased to generate a pressure gradient. When the suspension plate 2221a of the gas-injection plate 2221 is driven by the piezoelectric plate 2223c to move toward the bottom surface of the gas-guiding-component loading region 2215, the gas in the resonance chamber 2226 is discharged out rapidly through the hollow aperture 2221b, and the gas in the flowing chamber 2227 is compressed, thereby the converged gas is quickly and massively ejected out of the flowing chamber 2227 under the condition close to an ideal gas state of the Benulli's law, and transported to the ventilation hole 2215a of the gas-guiding-component loading region 2215.

Figure 9A:
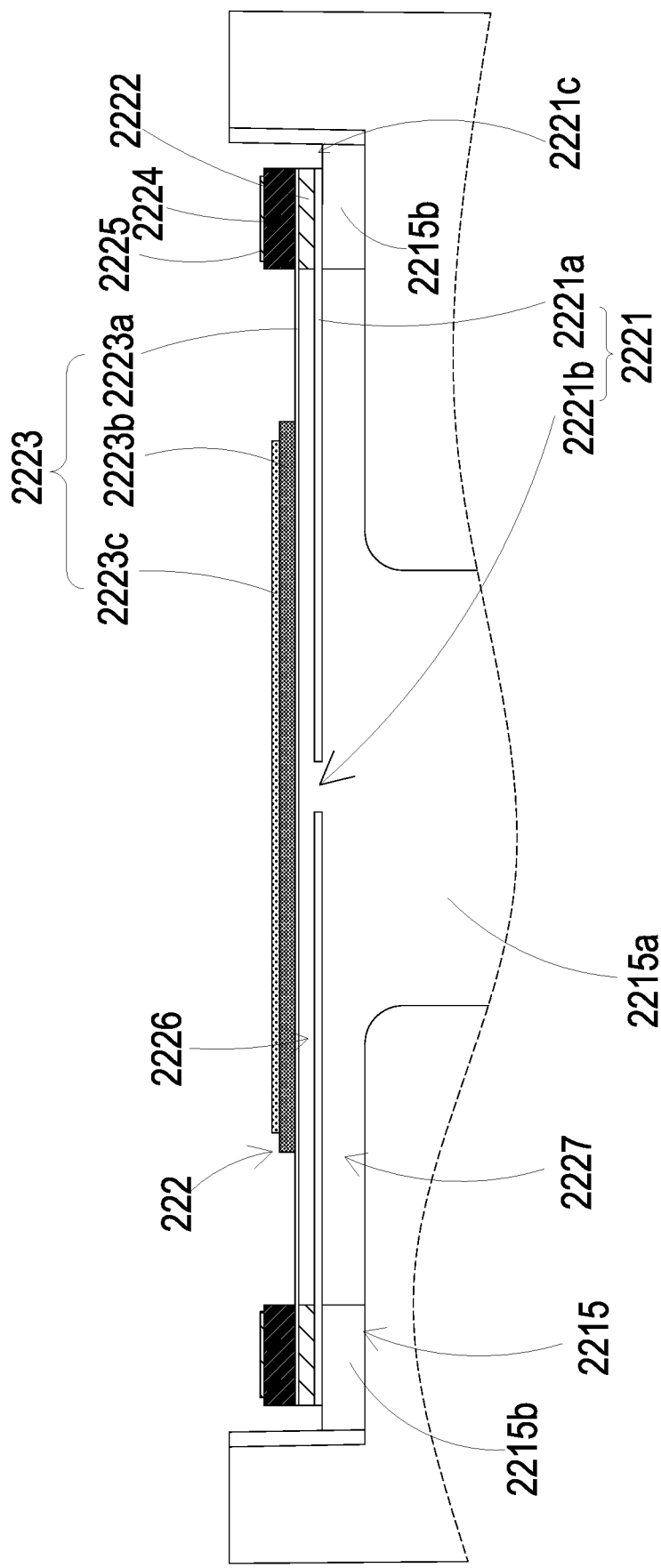
FIG. 9A is a schematic cross-sectional view illustrating the piezoelectric actuator before operation according to an embodiment of the present disclosure.
Figure 9B:
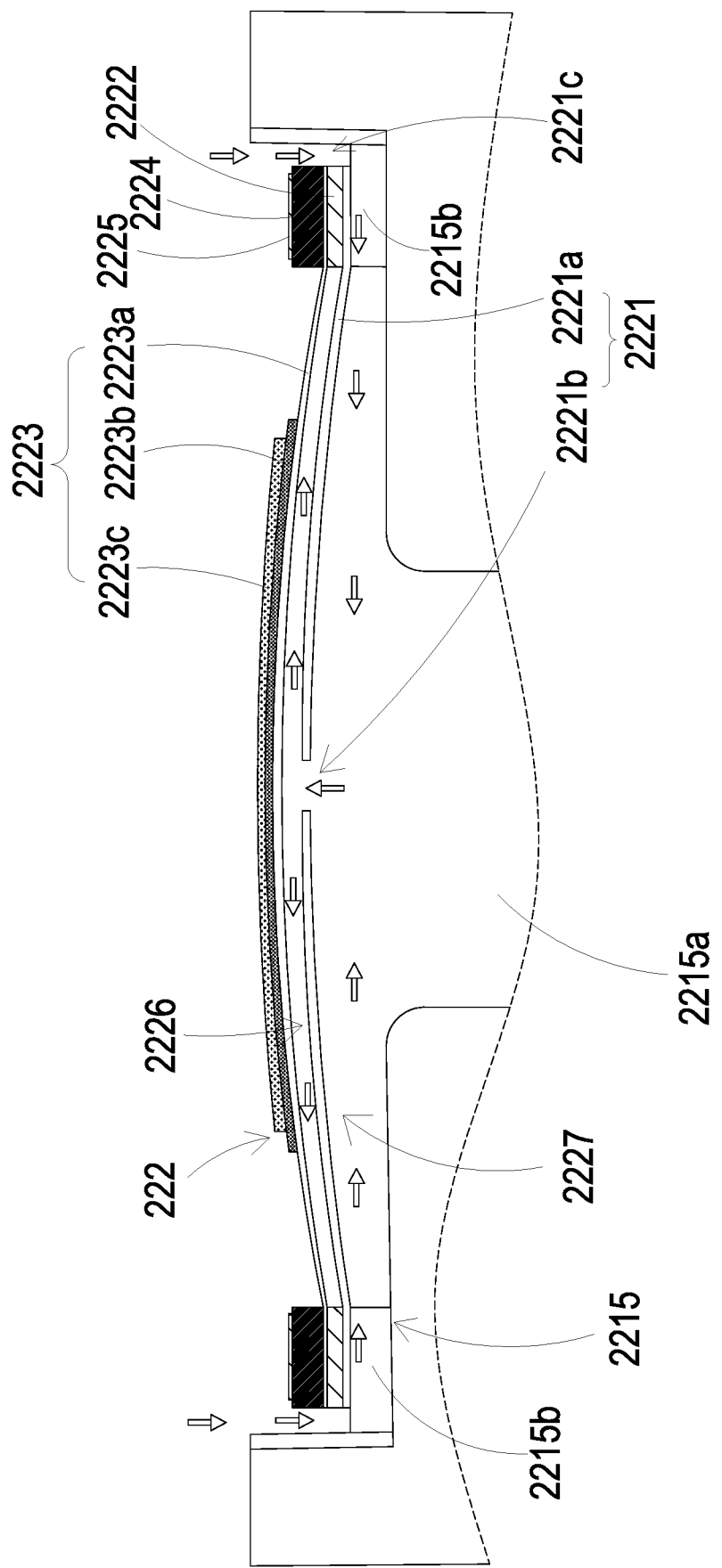
FIG. 9B is a schematic cross-sectional view illustrating a first operation step of the piezoelectric actuator according to the embodiment of the present disclosure.
Figure 9C:
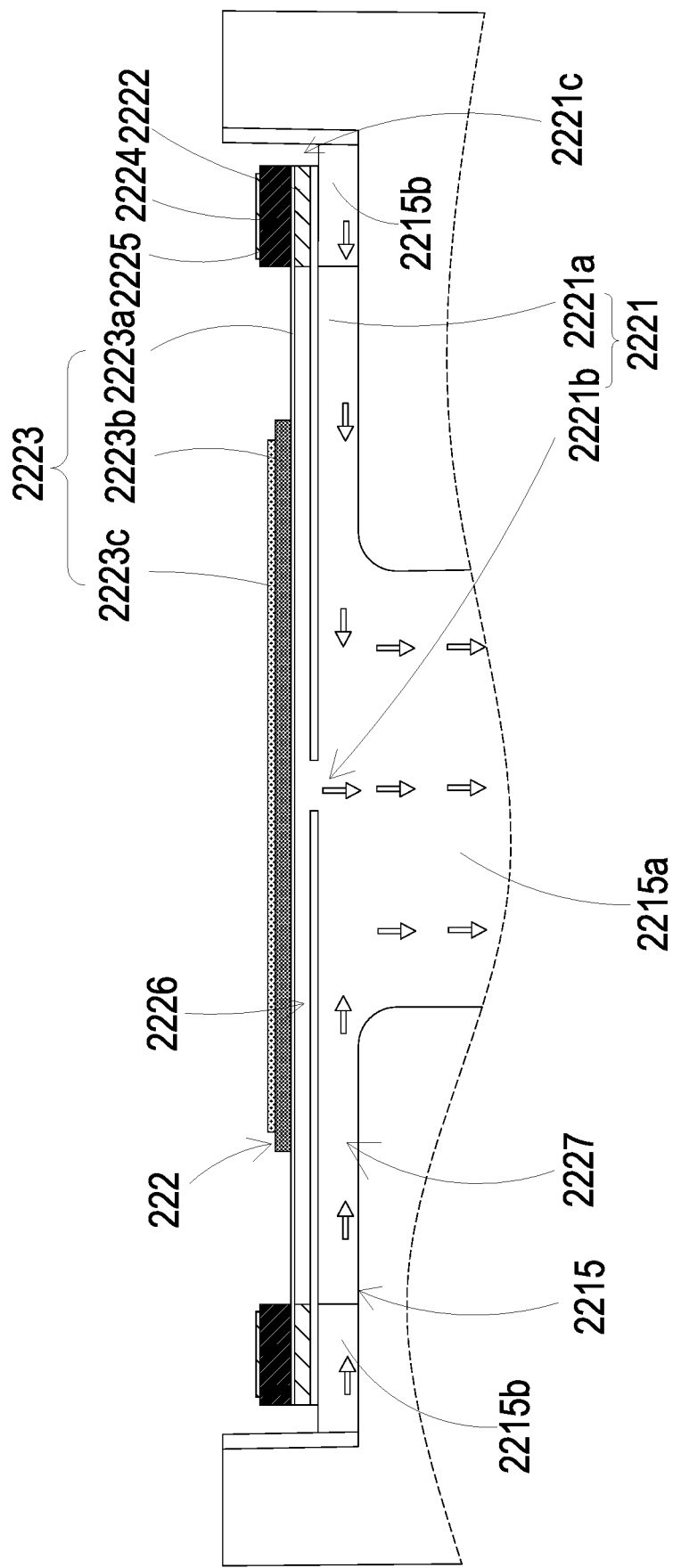
FIG. 9C is a schematic cross-sectional view illustrating a second operation step of the piezoelectric actuator according to the embodiment of the present disclosure.

By repeating the operation steps shown in FIG. 9B and FIG. 9C, the piezoelectric plate 2223c is driven to vibrate in a reciprocating manner. According to the principle of inertia, since the gas pressure inside the resonance chamber 2226 is lower than the equilibrium gas pressure after the converged gas is ejected out, the gas is introduced into the resonance chamber 2226 again. Moreover, the vibration frequency of the gas in the resonance chamber 2226 is controlled to be close to the vibration frequency of the piezoelectric plate 2223c, so as to generate the Helmholtz resonance effect to achieve the gas transportation at high speed and in large quantities.

Figure 10A:
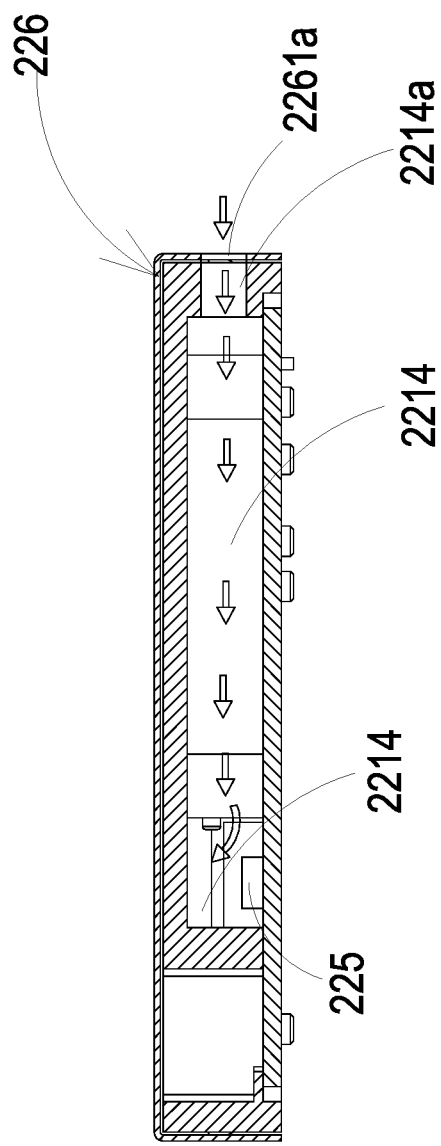
FIG. 10A is a schematic cross-sectional view illustrating an inlet path of the air through an inlet opening of an outer cover according to an embodiment of the present disclosure.
Figure 10B:
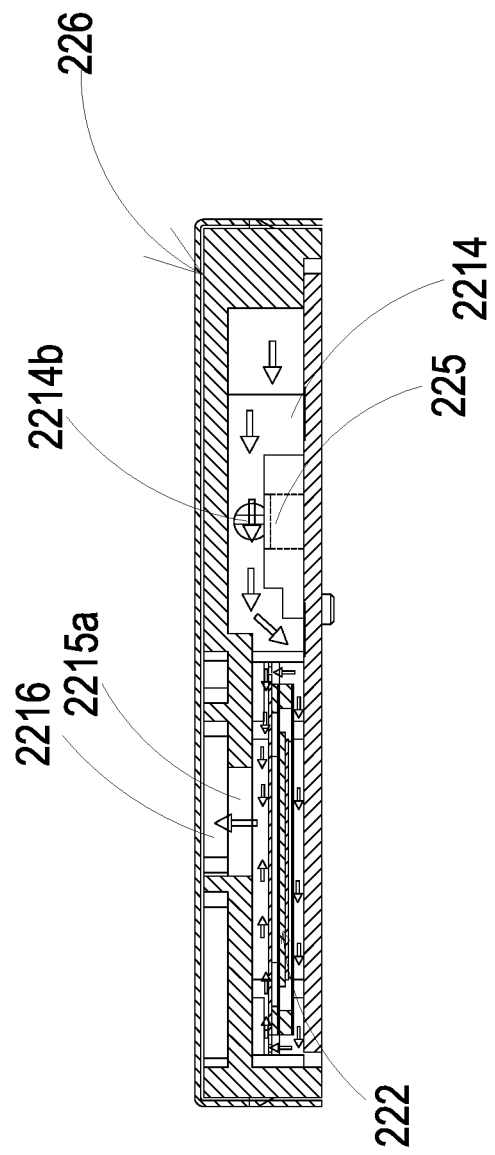
FIG. 10B is a schematic cross-sectional view illustrating a light beam path from the laser component passing through a transparent window and entering a gas-inlet groove according to the embodiment of the present disclosure.
Figure 10C:
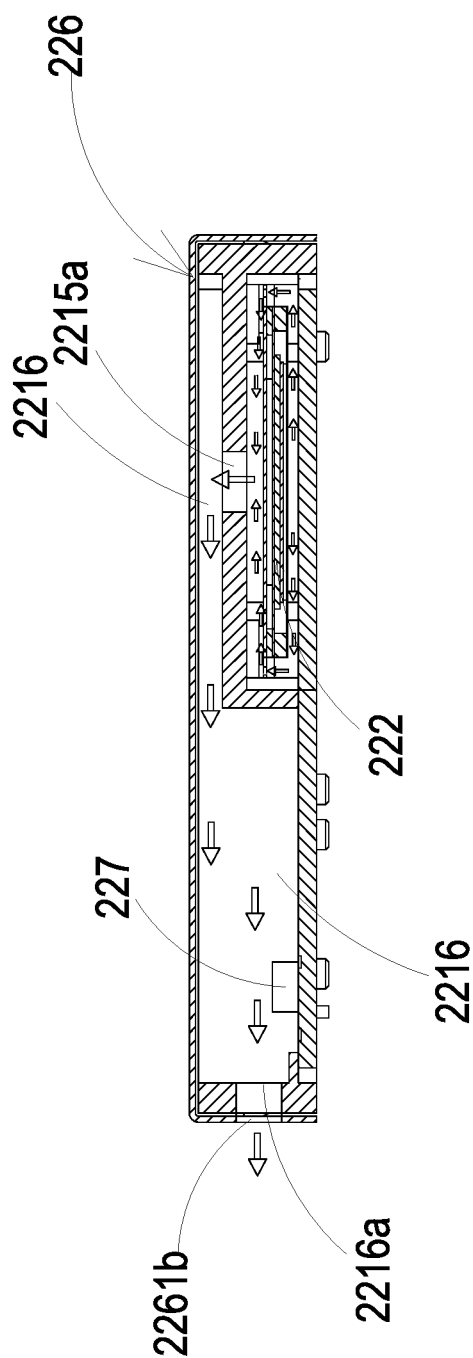
FIG. 10C is a schematic cross-sectional view illustrating an outlet path of the air discharged outside through a gas-outlet and an outlet opening according to the embodiment of the present disclosure.

As shown in FIG. 10A to FIG. 10C, the gas is inhaled through the inlet opening 2261a of the outer cover 226, flows into the gas-inlet groove 2214 of the base 221 through the gas-inlet 2214a, and is transported to the position of the particulate sensor 225. Moreover, the piezoelectric actuator 222 is enabled continuously to inhale the gas into the inlet path so as to facilitate the gas outside the gas detection module to be introduced rapidly, flowed stably, and be transported above the particulate sensor 225. At this time, a projecting light beam emitted from the laser component 224 passes through the transparent window 2214b and enters into the gas-inlet groove 2214 to irritate the suspended particles contained in the gas flowing above the particulate sensor 225 in the gas-inlet groove 2214. When the suspended particles contained in the gas are irradiated and generate scattered light spots, the scattered light spots are received and calculated by the particulate sensor 225 for obtaining related information about the sizes and the concentration of the suspended particles contained in the gas. Furthermore, the gas above the particulate sensor 225 is continuously driven and transported by the piezoelectric actuator 222, flows into the ventilation hole 2215a of the gas-guiding-component loading region 2215, and is transported to the gas-outlet groove 2216. At last, after the gas flows into the gas-outlet groove 2216, the gas is continuously transported into the gas-outlet groove 2216 by the piezoelectric actuator 222, and thus the gas in the gas-outlet groove 2216 is pushed and discharged out through the gas-outlet 2216a and the outlet opening 2261b.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An air pollution prevention device for a baby carriage, for exchanging and filtering an air pollution source in the baby carriage, comprising:

a sealing cover hooding on the baby carriage, forming a sealed space in the baby carriage and capable of opening up or sealing off the baby carriage;

at least one filtration cleaner disposed around the baby carriage and partially penetrating the sealing cover from the outside thereof for introducing an air outside the baby carriage into the baby carriage and discharging the air pollution source out of the sealed space of the baby carriage, wherein the filtration cleaner comprises a gas-inlet channel and a gas-outlet channel, the opposite sides of the gas-inlet channel and the opposite sides of the gas-outlet channel respectively have a gas entrance and a gas exit, and each of the gas-inlet channel and the gas-outlet channel has a gas guider and a filtering and purifying component disposed therein, and the filtering and purifying component comprises a high-efficiency particulate air filter screen, wherein when the gas guider in the gas-inlet channel is enabled, the air outside the baby carriage is inhaled through the gas entrance, filtered by the filtering and purifying component, and introduced into the sealed space of the baby carriage through the gas exit, and when the gas guider in the gas-outlet channel is enabled, the air pollution source in the sealed space of the baby carriage is inhaled through the gas entrance, filtered by the filtering and purifying component, and discharged out of the baby carriage through the gas exit;

at least one gas detection module disposed at the gas entrances and the gas exits respectively of the gas-inlet channel and the gas-outlet channel, wherein the gas detection module comprises a microprocessor, a communicator and a gas detection main body, wherein the microprocessor controls a detection operation of the gas detection main body, the gas detection main body detects the air pollution source and outputting gas detection data, and the microprocessor receives, computes and processes the detection information to generate the gas detection data for providing to the communicator for external wireless transmission; and at least one intelligent control and process device for receiving and comparing the gas detection data outputted by the gas detection main body so as to intelligently select to send a driving command, wherein after receiving and comparing the gas detection data, the intelligent control and process device intelligently selects to enable the gas guider in the gas-inlet channel or the gas-outlet channel of the filtration cleaner, so as to filter and exchange the air pollution source in the baby carriage and generate a clean air under a monitored condition.

2. The air pollution prevention device as claimed in claim 1, wherein the air pollution source is one or a combination selected from the group consisting of particulate matters, carbon monoxide, carbon dioxide, ozone, sulfur dioxide, nitrogen dioxide, lead, total volatile organic compounds, formaldehyde, bacteria, fungi, and virus.

3. The air pollution prevention device as claimed in claim 1, wherein the sealing cover comprises a transparent covering body made from a glass or a high molecular weight polymer material.

4. The air pollution prevention device as claimed in claim 1, wherein the monitored condition is referring to that the gas detection data of the air pollution source inside the baby carriage is continuously detected by the gas detection module to make sure that the gas detection data does not exceed a safety detection value, wherein the safety detection value is one or a combination selected from the group consisting of 0-5 $\mu g/m^3$ of the value of $PM_{2.5}$, less than 1000 ppm of the carbon dioxide content, less than 0.56 ppm of the total volatile organic compounds content, less than 0.08 ppm of the formaldehyde content, less than 1500 $CFU/m^3$ of the amount of bacteria, less than 1000 $CFU/m^3$ of the amount of fungi, less than 0.075 ppm of the sulfur dioxide ($SO_2$) content, less than 0.1 ppm of the nitrogen dioxide content, less than 9 ppm of the carbon monoxide content, less than 0.06 ppm of the ozone content, and less than 0.15 $\mu g/m^3$ of the value of lead.

5. The air pollution prevention device as claimed in claim 1, wherein the gas detection module comprises a control circuit board, wherein the gas detection main body, the microprocessor and the communicator are integrally packaged on the control circuit board and electrically connected with the control circuit board.

6. The air pollution prevention device as claimed in claim 5, wherein the gas detection main body comprises:
a base comprising:
  a first surface;
  a second surface opposite to the first surface;
  a laser loading region hollowed out from the first surface to the second surface;
  a gas-inlet groove concavely formed from the second surface and disposed adjacent to the laser loading region, wherein the gas-inlet groove comprises a gas-inlet and a transparent window opened on the lateral wall thereof and is in communication with the laser loading region;
  a gas-guiding-component loading region, concavely formed from the second surface, in communication with the gas-inlet groove and having a ventilation hole penetrated a bottom surface thereof; and
  a gas-outlet groove concavely formed from a region of the first surface spatially corresponding to the bottom surface of the gas-guiding-component loading region and hollowed out from the first surface to the second surface in a region where the first surface is misaligned with the gas-guiding-component loading region, wherein the gas-outlet groove is in communication with the ventilation hole and comprises a gas-outlet mounted thereon;
a piezoelectric actuator accommodated in the gas-guiding-component loading region;
a driving circuit board attaching and covering to the second surface of the base;
a laser component positioned and disposed on the driving circuit board and electrically connected to the driving circuit board, and accommodated in the laser loading region, wherein a light beam emitted from the laser component passes through the transparent window and extends in an orthogonal direction perpendicular to the gas-inlet groove;
a particulate sensor positioned and disposed on the driving circuit board and electrically connected to the driving circuit board, and accommodated in the gas-inlet groove at a region in an orthogonal direction perpendicular to the light beam path from the laser component, for detecting suspended particulates in the air pollution source passing through the gas-inlet groove and irradiated by a light beam emitted from the laser component;
a gas sensor positioned and disposed on the driving circuit board and electrically connected to the driving circuit board, and accommodated in the gas-outlet groove, for detecting the air pollution source guided into the gas-outlet groove; and
an outer cover covering the base and comprising a lateral plate, wherein the lateral plate comprises an inlet opening and an outlet opening, and wherein the inlet opening is spatially corresponding to the gas-inlet of the base and the outlet opening is spatially corresponding to the gas-outlet of the base,
wherein the first surface of the base is covered by the outer cover, and the second surface of the base is covered by the driving circuit board, so that an inlet path is defined by the gas-inlet groove and an outlet path is defined by the gas-outlet groove, thereby the piezoelectric actuator introduces the air pollution source outside the gas-inlet of the base into the inlet path defined by the gas-inlet groove through the inlet opening, the particulate sensor detects a concentration of the particulates contained in the air pollution source, and the air pollution source enters the outlet path defined by the gas-outlet groove through the ventilation hole is detected by the gas sensor and discharged through the gas-outlet of the base and the outlet opening.

7. The air pollution prevention device as claimed in claim 6, wherein the particulate sensor detects information of suspended particles.

8. The air pollution prevention device as claimed in claim 6, wherein the gas sensor comprises a volatile-organic-compound sensor for detecting information of carbon dioxide or total volatile organic compounds.

9. The air pollution prevention device as claimed in claim 6, wherein the gas sensor comprises a formaldehyde sensor, a bacteria sensor, a virus sensor, a temperature and humidity sensor or a combination thereof, and wherein the formaldehyde sensor detects information of formaldehyde in the gas, the bacteria sensor detects information of bacteria or fungi in the gas, the virus sensor detects information of viruses in the gas, and the temperature and humidity sensor detects information of temperature and humidity of the gas.

10. The air pollution prevention device as claimed in claim 6, wherein the intelligent control and process device wirelessly receives the gas detection data and sends the driving command.

11. The air pollution prevention device as claimed in claim 10, wherein the intelligent control and process device is connected with a cloud processing device for transmitting the received gas detection data to the cloud processing device, and the cloud processing device compares and intelligently computes the received gas detection data so as to send the driving command to the intelligent control and process device for further transmitting to the gas detection modules, thereby driving an enablement of the gas guider in the gas-inlet channel or the gas-outlet channel of the filtration cleaner.

12. The air pollution prevention device as claimed in claim 10, wherein the intelligent control and process device is one of a portable mobile device or a wearable device.

13. The air pollution prevention device as claimed in claim 12, wherein the intelligent control and process device comprises a display for displaying the gas detection data inside the baby carriage.

14. The air pollution prevention device as claimed in claim 1, wherein the gas detection modules located at the gas exit of the gas-inlet channel and the gas entrance of the gas-outlet channel are used for detecting the gas outside the baby carriage, and the gas detection modules located at the gas entrance of the gas-inlet channel and the gas exit of the gas-outlet channel are used for detecting the air pollution source inside the baby carriage, so that the intelligent control and process device receives and compares the gas detection data outputted by the gas detection modules to make sure that the filtering and purifying component of the filtration cleaner is able to filter the gas outside the baby carriage so as to generate a clean air introduced into the baby carriage.

15. The air pollution prevention device as claimed in claim 14, wherein when the gas detection data detected by the gas detection module at the gas exit of the gas-inlet channel and the gas entrance of the gas-outlet channel is higher than the gas detection data detected by the gas detection module at the gas entrance of the gas-inlet channel and the gas exit of the gas-outlet channel, the intelligent control and process device intelligently selects to enable the gas guiders in the gas-inlet channel and the gas-outlet channel, and wherein the air outside the baby carriage is inhaled through the gas entrance of the gas-inlet channel, filtered by the filtering and purifying component, and introduced into the baby carriage through the gas exit as the gas guider in the gas-inlet channel is enabled, and the air pollution source inside the baby carriage is inhaled through the gas entrance, filtered by the filtering and purifying component, and discharged out of the baby carriage through the gas exit as the gas guider in the gas-outlet channel is enabled, thereby the air pollution source inside the baby carriage can be filtered and exchanged to generate a clean air under a monitored condition.

16. The air pollution prevention device as claimed in claim 14, wherein a plurality of filtration cleaners are disposed around the baby carriage, and the intelligent control and process device receives and compares the gas detection data inside the baby carriage detected by at least three gas detection modules for intelligently computing to locate the position of the air pollution source in the baby carriage, so as to intelligently select to enable the gas guider in the gas-outlet channel of the filtration cleaner nearest the pollution source, thereby accelerating an inhalation of the air pollution source through the gas entrance of the gas-outlet channel before diffusion.

17. The air pollution prevention device as claimed in claim 14, wherein a plurality of filtration cleaners are disposed around the baby carriage, and the intelligent control and process device receives and compares the gas detection data inside the baby carriage detected by at least three gas detection modules for executing an intelligent computation to locate the position of the air pollution source in the baby carriage, so as to intelligently select to preferentially enable the gas guider in the gas-outlet channel of the filtration cleaner nearest the pollution source, and at the same time, the intelligent control and process device also selects to enable the gas guiders in the gas-inlet channels of the other filtration cleaners under the intelligent computation for generating an airflow to guide and direct the air pollution source toward the gas guider of the filtration cleaner nearest the air pollution source to be filtered rapidly.

18. The air pollution prevention device as claimed in claim 1, wherein the filtering and purifying component further comprises an activated carbon filter screen and a zeolite filter screen.

19. The air pollution prevention device as claimed in claim 18, wherein the high efficiency particulate air filter screen is coated with one or a combination selected from the group consisting of a layer of a cleansing factor containing chlorine dioxide, an herbal protective layer extracted from ginkgo and Japanese rhus chinensis, and a layer of silver ions, wherein the cleansing factor containing chlorine dioxide inhibits viruses and bacteria in the air pollution source, the herbal protective layer extracted from ginkgo and Japanese rhus chinensis constitutes an herbal protective antiallergic filter so as to resist allergy effectively and destroy a surface protein of influenza virus, and the layer of silver ions inhibits viruses and bacteria contained in the air pollution source.

20. The air pollution prevention device as claimed in claim 18, wherein the filtering and purifying component further comprises at least one or a combination selected from the group consisting of a photo-catalyst unit, a photoplasma unit, a negative ionizer, and a plasma ion unit.

\* \* \* \* \*